United States Patent Office 2,722,558
Patented Nov. 1, 1955

2,722,558

PRODUCTION OF FLUOROETHYLENES

Howard Johnston, Pittsburg, Calif., assignor to The Dow Chemical Company, Midland, Mich., a corporation of Delaware No Drawing. Application December 5, 1951, Serial No. 260,106

3 Claims. (Cl. 260—653)

This invention relaes to a new and improved process for making 1,1-difluoroethylene and chlorinated derivatives thereof.

Heretofore, 1,1-difluoroethylene and chlorofluoroethylenes have been prepared by two-step processes involving the catalytic fluorination of a chlorinated ethane followed by dehalogenation or dehydrohalogenation. These preparations involve additional separations and purifications not required by a one-step process. Recently, Downing et al., in U. S. Patent 2,551,573 describe a process for the preparation of chlorofluoroethylenes by the pyrolysis of chlorofluoroethanes, but it involves low conversions and rather extensive side reactions.

It has been found that 1,1-difluoroethylene can be prepared in good yield by a simple one-step reaction in which ethylidene fluoride is heated with chlorine in the proportions and under the conditions hereinafter particularly described. Ethylidene fluoride is an available raw material which is readily made according to known methods by the addition of hydrogen fluoride to acetylene. It is, therefore, a principal object of the invention to provide a simple and direct process for the preparation of 1,1-difluoroethylene, in which the raw materials are ethylidene fluoride and chlorine.

The preparation of saturated chloro-fluoro hydrocarbons, such as dichlorodifluoromethane and analogs thereof, by reaction of ethylidene fluoride and chlorine has been disclosed in U. S. Patent 2,417,059 to Calfee et al., in a process involving the disunion of carbon atoms in the molecule of ethylidene fluoride. The patented process requires theoretically the consumption of at least five moles of chlorine per mole of ethylidene fluoride. While dichlorodifluoromethane is the principal product, substantial amounts of numerous other saturated chlorofluoro hydrocarbons are also formed, so that the yield of principal product is on the order of less than 40 mole per cent.

According to the present invention, ethylidene fluoride gives unsaturated reaction products containing the same number of carbon atoms, i. e., 1,1-difluoroethylene, 1-chloro-2,2-difluoroethylene, and 1,1-dichloro-2,2-difluoroethylene, which are obtained by limiting the proportion of reactants to from one to not more than 3.5 moles of chlorine per mole of ethylidene fluoride and maintaining the reaction temperature between 500° and 700° C. Depending upon the mole ratio of reactants within the stated limits, one or another of the said compounds can be obtained as the principal product. The overall chemical reactions may be represented by the following equations:

(1) $CH_3CHF_2 + Cl_2 \rightarrow CH_2 = CF_2 + 2HCl$
(2) $CH_3CHF_2 + 2Cl_2 \rightarrow CHCl = CF_2 + 3HCl$
(3) $CH_3CHF_2 + 3Cl_2 \rightarrow CCl_2 = CF_2 + 4HCl$ Thus, with a 1:1 mole ratio of reactants in the process, the dominant product is 1,1-difluoroethylene, accompanied by minor amounts of the mono- and dichloro derivatives. As the proportion of chlorine is increased up to a mole ratio of 3:1, the monochloro and dichloro derivatives are increased progressively at the expense of a lowered yield of 1,1-difluoroethylene. For highest yields of 1,1-difluoroethylene, the ratio of chlorine to ethylidene fluoride is in the range from 1:1 to 2:1. This ratio is increased to approximately 2:1 to 3 or 3.5:1 when chlorine substituted derivatives of 1,1-difluoroethylene are desired.

The reaction temperature is also varied according to the products desired. When 1,1-difluoroethylene is to be the principal product, the temperature employed is preferably in the range of 500° to 620° C. For the production of the mono- and dichlorodifluoroethylenes, the preferred temperature range is 620° to 700° C.

Other variables in the reaction conditions are contact time and pressure. Contact time (residence time in seconds of the reactant gases in the reaction zone) should be from 0.1 to 10.0 seconds, 0.2 to 5.0 seconds being preferred. Pressures approximating atmospheric pressure are satisfactory for carrying out the reaction although superatmospheric pressures may be used to increase the yield of reaction products per unit of reactor volume.

The invention may be carried out by passing a mixture of chlorine and ethylidene fluoride in desired proportions through a heated reaction tube. A corrosion resistant reactor constructed of silica or graphite may be used, which is equipped with an external means of heating, such as an electrical furnace or heating jacket. The ratio of reactant gases, their residence time in the reactor, and the temperature thereof, are regulated as above described to facilitate good conversions to the desired product. The product gases from the reactor are rapidly cooled and scrubbed with water or aqueous alkali to remove unreacted chlorine and hydrogen chloride. Except for 1,1-difluoroethylene, which boils at —83° C. and may be collected by displacing water from a conventional gas holder, essentially all the constituents of the scrubbed product gas may be liquefied by refrigeration and rectified by distillation.

The following examples serve to illustrate the practice of the invention:

*Example 1*

In the preparation of 1,1-difluoroethylene, 1.75 moles of chlorine and 1.0 mole of ethylidene fluoride per hour were metered separately into a silica reaction tube, the first third of which consisted of a preheat zone where the reactant gases were also mixed by means of a short asbestos spiral fitting closely between a thermocouple well and the silica wall. The preheated reactant gases next entered the reaction zone where residence time was 1.4 seconds at a maximum temperature of 610° C. The duration of run was 2.5 hours. The effluent gas was rapidly cooled in a water jacketed condenser and freed of hydrogen chloride and unreacted chlorine by washing with aqueous sodium hydroxide. The washed gas was further cooled in a series of cold traps, the first of which was immersed in an ice-salt mixture and the others in a mixture of a dichloromethane and solid carbon dioxide. Essentially all of the washed gas was liquefied except 1,1-difluoroethylene, which was collected by water displacement. The material collected in the cold traps was separated by fractional distillation. Analysis of the total organic product is as follows (mole per cent):

56.2% 1,1-difluoroethylene
13.4% 1-chloro-2,2-difluoroethylene
9.3% 1,1-dichloro-2,2-difluoroethylene
8.2% 1,1,2-trichloro-2,2-difluoroethane
11.9% ethylidene fluoride For the preparation of 1-chloro-2,2-difluoroethylene and 1,1-dichloro-2,2-difluoroethylene, the reaction was run for 5.8 hours at conditions which were adjusted to a maximum temperature of 680° C. and a contact time of 0.5 second. The reactant gases consisted of 5.5 moles of chlorine and 1.8 moles of ethylidene fluoride per hour, which represents a mole ratio of approximately 3:1. The general procedure outlined in Example 1 was followed in this example. Product analysis is as follows (mole per cent):

7.6% 1,1-difluoroethylene
17.8% 1-chloro-2,2-difluoroethylene
42.6% 1,1-dichloro-2,2-difluoroethylene
7.0% 1,1,2-trichloro-2,2-difluoroethane
7.7% 1,1,1,2-tetrachloro-2,2-difluoroethane
7.8% perchloroethylene
9.5% chiefly ethylidene fluoride

*Example 3*

The same general procedure described in the previous examples was used for the preparation of 1,1-difluoroethylene and 1,1-dichloro-2,2-difluoroethylene. Reactant gases were adjusted to 2.9 moles of chlorine and 1.3 moles of ethylidene fluoride per hour, which represents a mole ratio of about 2.2:1. The reaction was carried out for 5.0 hours at a maximum temperature of 680° C. and a contact time of 0.9 second. The product analysis is given below (mole per cent):

27.7% 1,1-difluoroethylene
16.5% 1-chloro-2,2-difluoroethylene
33.7% 1,1-dichloro-2,2-difluoroethylene
6.8% 1,1,2-trichloro-2,2-difluoroethane
4.6% 1,1,1,2-tetrachloro-2,2-difluoroethane
3.0% perchloroethylene
7.7% ethylidene fluoride

I claim:
1. The process which comprises passing chlorine and ethylidene fluoride in a mole ratio between 1:1 and 3.5:1 through a reaction zone maintained at a temperature between about 500° and 700° C. at a flow rate such that the contact time is not less than 0.1 second, and separating as principal products compounds from the group consisting of 1,1-difluoroethylene, 1-chloro-2,2-difluoroethylene, and 1,1-dichloro-2,2-difluoroethylene.

2. The process which comprises passing chlorine and ethylidene fluoride in a mole ratio between 1:1 and 2:1 through a reaction zone maintained at a temperature between about 500° and 620° C. at a flow rate such that the contact time is not less than 0.1 second, and separating 1,1-difluoroethylene as the principal product.

3. The process which comprises passing chlorine and ethylidene fluoride in a mole ratio between 2:1 and 3.5:1 through a reaction zone maintained at a temperature between about 620° and 700° C. at a flow rate such that the contact time is not less than 0.1 second, and separating as principal products compounds from the group consisting of 1-chloro-2,2-difluoroethylene and 1,1-dichloro-2,2-difluoroethylene.

References Cited in the file of this patent

UNITED STATES PATENTS

| | | |
|---|---|---|
| 2,410,647 | Fleming et al. | Nov. 5, 1946 |
| 2,459,767 | Calfee et al. | Jan. 18, 1949 |
| 2,566,163 | Calfee et al. | Aug. 28, 1951 |
| 2,572,913 | Calfee et al. | Oct. 30, 1951 |
| 2,644,845 | McBee | July 7, 1953 |